United States Patent
Kanemitsu et al.

[11] Patent Number: 5,077,885
[45] Date of Patent: Jan. 7, 1992

[54] METHOD OF ASSEMBLING A FRONT PART OF A VEHICLE BODY

[75] Inventors: Norihiko Kanemitsu; Kazuhiro Hara; Noboru Yoshii; Takashi Kitayama, all of Hiroshima, Japan

[73] Assignee: Mazda Motor Corporation, Japan

[21] Appl. No.: 642,486

[22] Filed: Jan. 17, 1991

[30] Foreign Application Priority Data
Jan. 17, 1990 [JP] Japan ............................ 2-9234

[51] Int. Cl.$^5$ .................... B21D 39/03; B23P 11/00; B23P 21/00
[52] U.S. Cl. ............................... 29/430; 29/428; 29/469
[58] Field of Search .............. 29/426.1, 428, 429, 29/430, 431, 469

[56] References Cited
U.S. PATENT DOCUMENTS 4,573,626 3/1986 Nishiyama ........................ 29/429 X
4,589,184 5/1986 Asano et al. ..................... 29/430
4,914,802 4/1990 Takao et al. ..................... 29/469
4,991,282 2/1991 Konig ............................ 29/430 X

FOREIGN PATENT DOCUMENTS 0160971 7/1987 Japan ............................ 29/430
0078885 4/1988 Japan ............................ 29/430

Primary Examiner—Timothy V. Eley
Assistant Examiner—C. Richard Martin
Attorney, Agent, or Firm—Thompson, Hine and Flory

[57] ABSTRACT

A method of assembling a front part of a vehicle body. After nose unit having at least a shroud panel and a shroud upper is constructed, the nose unit is mounted to a vehicle body. Before mounting the nose unit to the vehicle body, right and left front fenders are removed from the vehicle body. The nose unit is mounted to the vehicle body under such a condition that front fenders are removed as described above. Then front fenders are mounted to the vehicle body.

5 Claims, 7 Drawing Sheets

METHOD OF ASSEMBLING A FRONT PART OF A VEHICLE BODY

BACKGROUND OF THE INVENTION

This invention relates to an asembling method of a front body of a vehicle having a nose unit including both a shroud panel and a shroud upper mounted to the vehicle body after the nose unit is constructed.

In the conventional art of the vehicle assembling line (main line), since each component to be fitted to a front part of a vehicle body such as a bumper, a radiator grille, head lumps, and a radiator is fitted there at each different station, the number of stations increased and accordingly, the line becomes longer and more complicated. It also has an operational problem since the operator on a mixed flow line, in which a various type of vehicles are assembled, needs to make a decision whether the components should be fitted to the vehicle body depending on a vehicle type.

By incorporating several components into one unit, easing the operation on the assembling line and reducing the number of station can be planned. Therefore, precision for fitting components to the unit can also be improved since the whole unit is assembled in a separate line.

Considering the above aspects, the Japanese Patent Application Laying Open Gazette No. 63-103771 proposes to incorporate components such as a radiator, head lumps, a bumper, and a radiator grille to one unit by fitting them to a radiator core support and mount this unit to a front part of a vehicle body.

However, under such a structure, when a bumper steer for supporting the bumper is fixed to the vehicle body, fitting may be difficult since a cross member is positioned below the bumper steer. It also may not be applied for such contemporary vehicles that a front fender curves to the inboard greatly or right and left end side of combination lumps disposed on the outside of head lumps are designed to be inclined upwardly or downwardly since both ends of the shroud upper panel in the widthwise direction on the nose unit side and combination lumps interfere with front fenders when the nose unit is inserted from the front. In other words, as shown in FIG. 8, both ends $b_1$ of the shroud upper b which is a mounting portion for the unit to the vehicle body (wheel apron reinforcement a) may interfere with the front end portion $c_1$ of the front fender positioned in the inner side of the vehicle body at inserting the unit. The vertical line l designates a inserting line of the unit and the dotted line P designates a mounting position of the unit.

SUMMARY OF THE INVENTION

The object of the present invention is to provide a method of assembling such a front part of a vehicle body that the nose unit is mounted to a front part of a vehicle body without interfering a front fender.

To achieve the above object, the nose unit is mounted to a vehicle body once after front fenders are removed.

After a nose unit is constructed, the nose unit is mounted to the front part of a vehicle body. In detail, right and left front fenders are removed from the vehicle body before the nose unit is mounted to the vehicle body and under such a situation, the nose unit is mounted to the vehicle body. Then front fenders are mounted to the vehicle body.

In other words, right and left front fenders are removed. Then the nose unit is mounted to the vehicle body when right and left front fenders are still removed. Since right and left front fenders are removed from the vehicle body, nose unit won't interfere with front fenders at mounting in spite of the configuration of the nose unit. After nose unit is mounted to the vehicle body, front fenders are mounted to the vehicle body.

In this invention, after doors are removed from the vehicle body before the nose unit is mounted to the vehicle body, front fenders are removed. Then after right and left front fenders are mounted to the vehicle body, doors are mounted to the vehicle body in relation to a position of front fenders.

In the present invention, doors are conveyed separately from front fenders and door parts are mounted to doors while doors are removed from the vehicle body and later doors are mounted to the vehicle body.

In this invention, the nose unit comprises a bumper and a radiator, etc. other than a shroud panel and a shroud upper, those parts are subassembled before being mounted to the vehicle body.

The above and other objects, features, and advantages of the present invention will be more apparent with the description of the preferred embodiment in reference to the accompanying drawings.

BRIEF DESCRIPTION OF THE DRAWINGS

Accompanying drawings show a prefered embodiment of the present invention, in which.

DESCRIPTION OF THE PREFERRED EMBODIMENT

The prefered embodiment will be described below with reference to the accompanying drawings.

Figure 1:
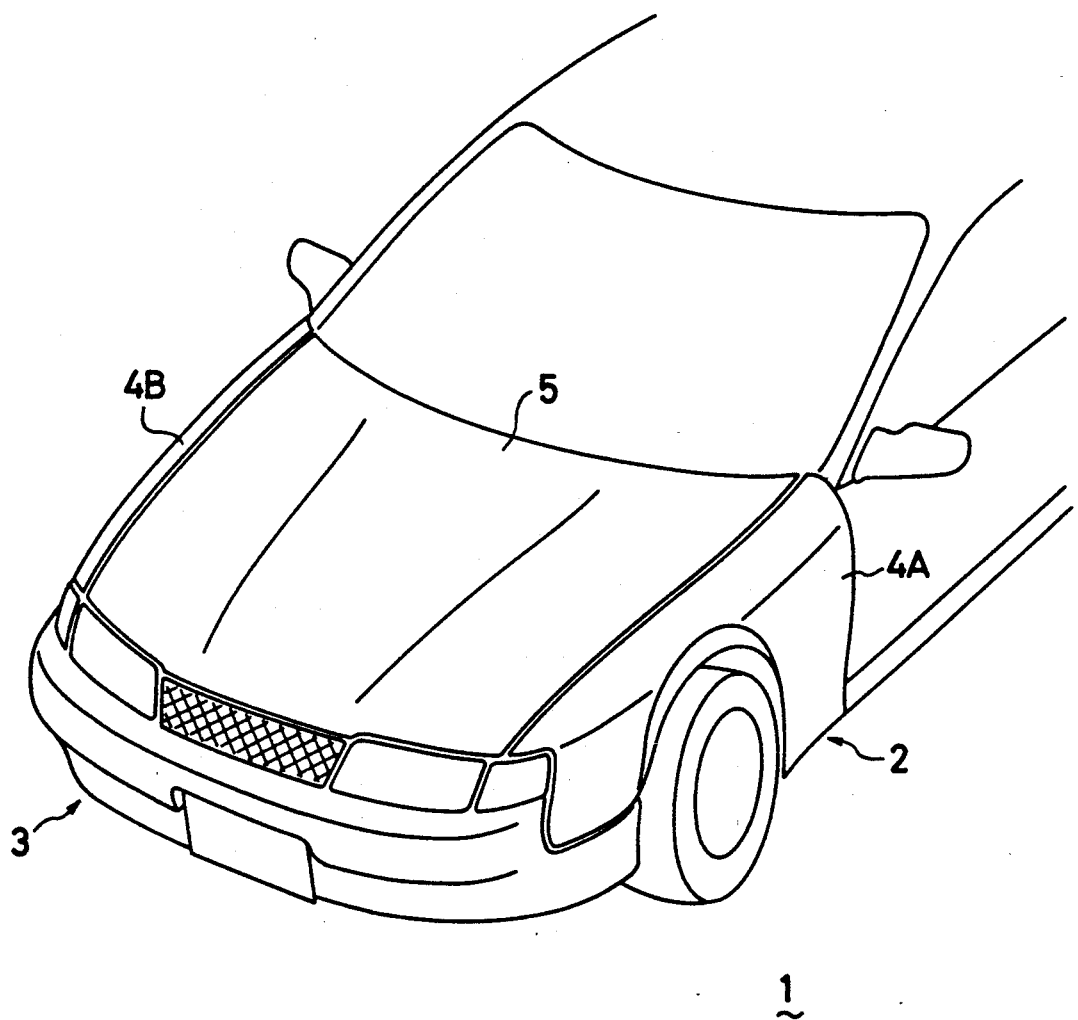
FIG. 1 is a perspective view of a front part of a vehicle.

In FIG. 1 illustrating a front part of a vehicle, reference numeral 1 designates a vehicle, a nose unit 3 is mounted on the front part of a vehicle body 2. Front fenders 4A, 4B are provided on the both outer ends of the body 2, and a bonnet 5 is provided on the front top of the vehicle body 2.

Figure 2:
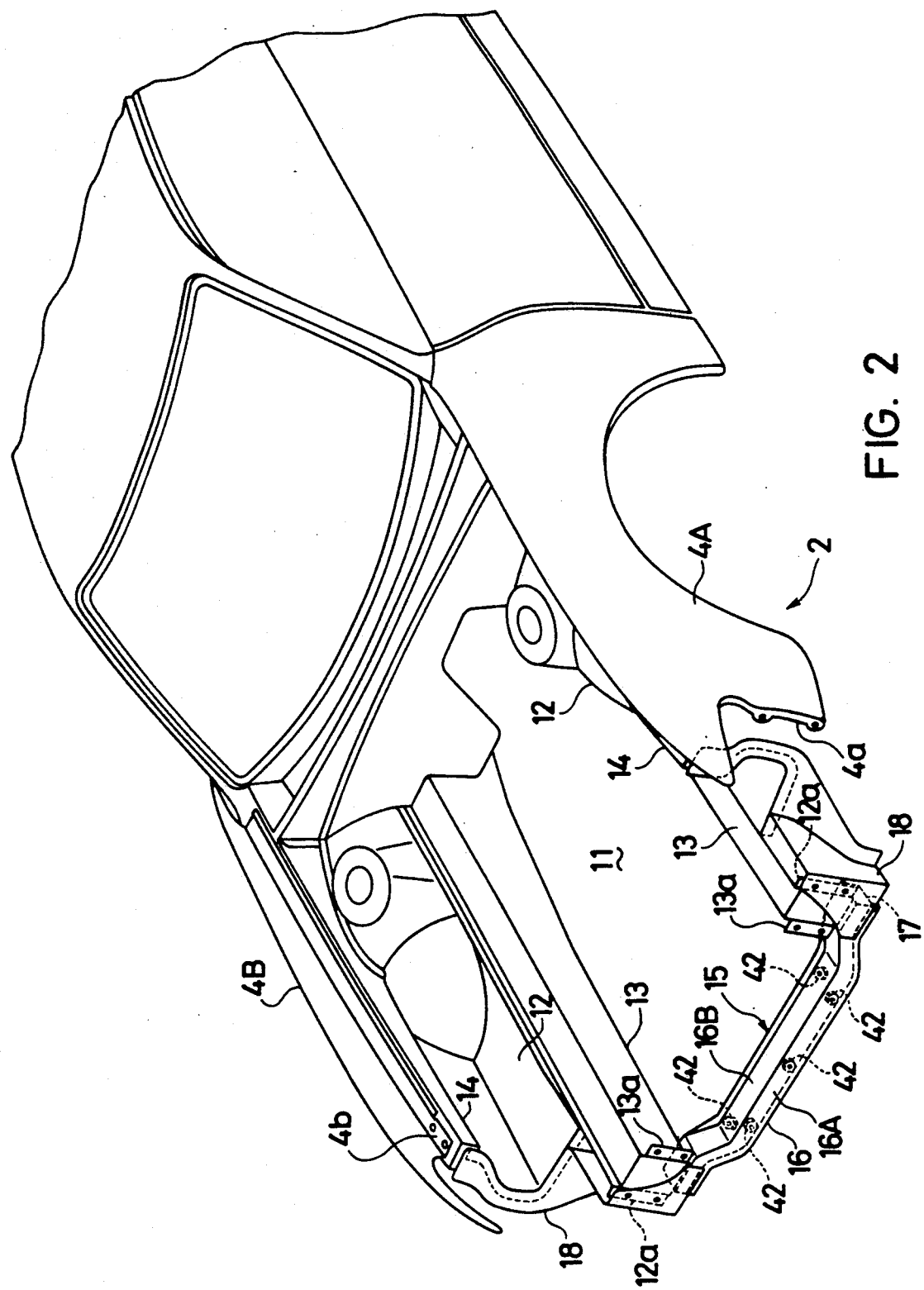
FIG. 2 is a perspective view of a front part of a vehicle body.

In the vehicle body 2, as shown in detail in FIG. 2, front side flames 13 are connected to an under side of wheel aprons 12 forming right and left side wells of an engine room 11 so that a closed sectional construction extending longitudinally of the vehicle body is formed. Wheel apron reinforcements 14 are connected to an upper side of the wheel aprons 12.

A cross member 15 is disposed between front side flames 13. The cross member 15 comprises both an upper member 16 having a front wall part 16A extending vertically on the front and an upper wall part 16B extending rearwardly from an upper end of the front wall part 16A and a lower member 17. The cross member 15 construct a closed sectional construction extending in the widthwise direction of the vehicle body, and both right and left ends of the cross member 15 is fixed on the under side of front side flames 13.

Also, front end panels 18 are provided on the front end portion of wheel aprons 12, wheel reinforcements 14, and front side flames 13.

Figure 3:
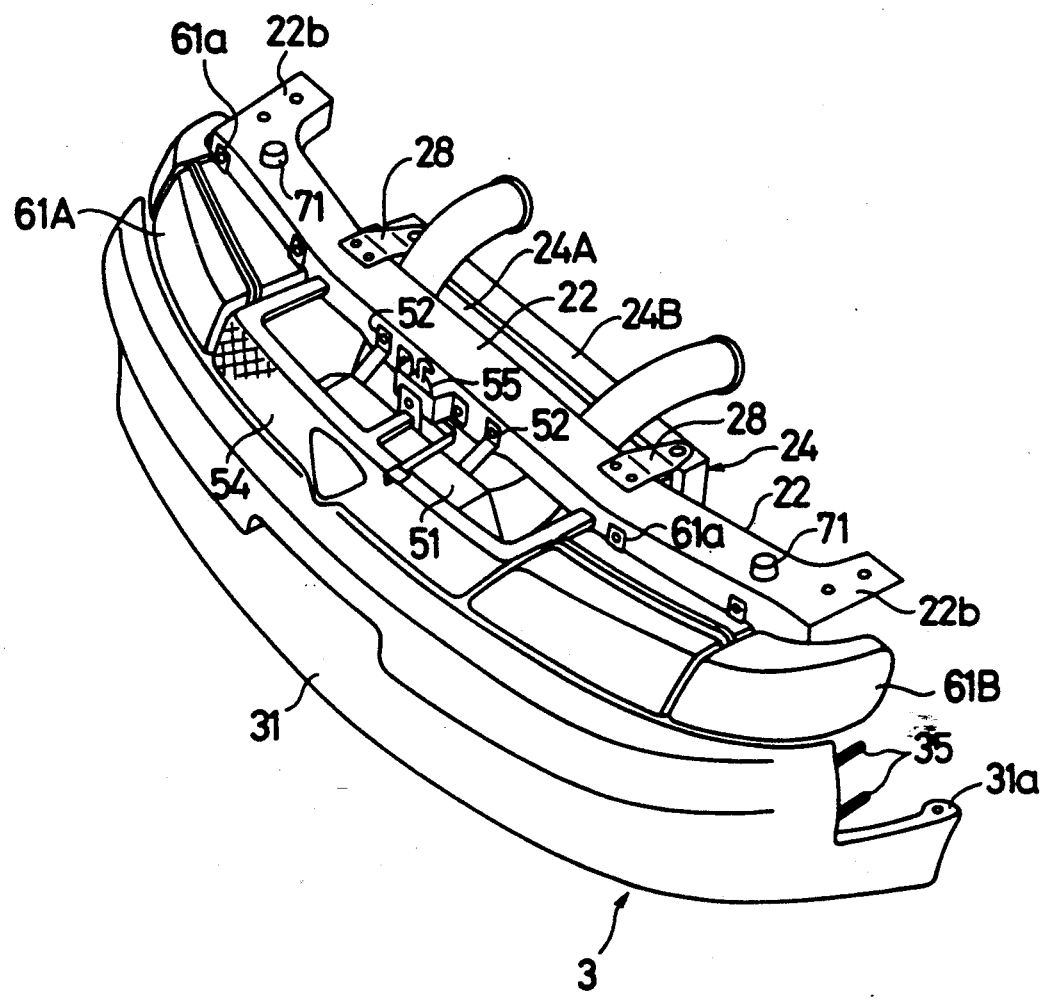
FIG. 3 is a perspective view of a nose unit.
Figure 4:
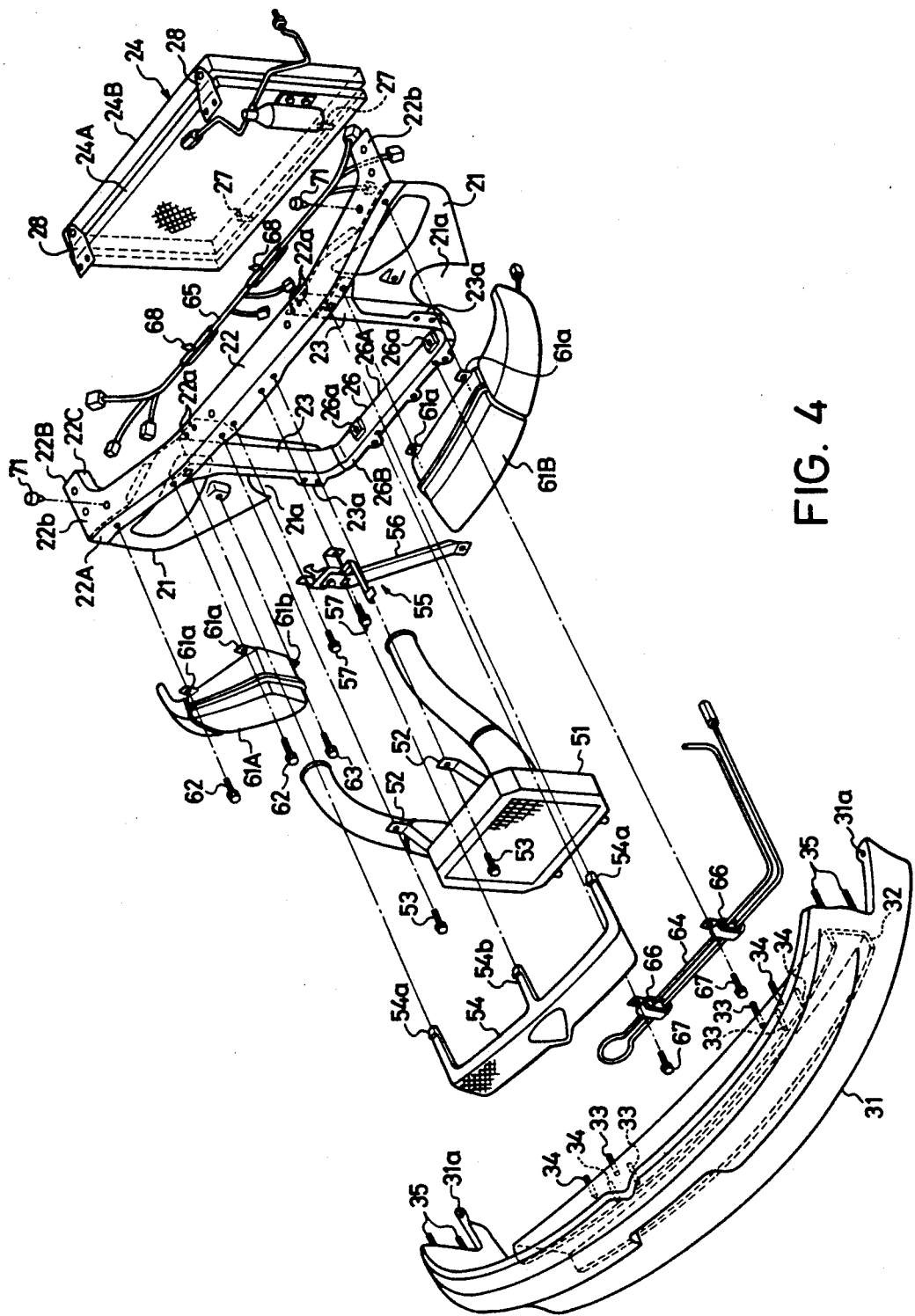
FIG. 4 is an exploded perspective view of a nose unit.

The nose unit 3 is constructed as illustrated in detail in FIGS. 3 and 4. The unit base of the nose unit 3 is connected to a shroud upper 22 extending in the widthwise direction of the vehicle body on the upper end portions of shroud panels 21. This shroud upper 22 comprises a vertical wall part 22A extending vertically and an upper wall part 22B extending rearwardly from the upper end of the vertical wall part 22A. A pair of vertical members 23 are hunging down from a center part in the widthwise direction of the upper wall part 22B. A support member 26 of approximately L-shaped closed section is disposed on both ends of vertical members 23. The support member 26 comprises an upper wall part 26A for supporting a condenser 24A and a radiator 24B which are heavyweight members, and a vertical wall part 26B extending downwardly from a front end of the upper wall part 26A.

Figures 5, 6:
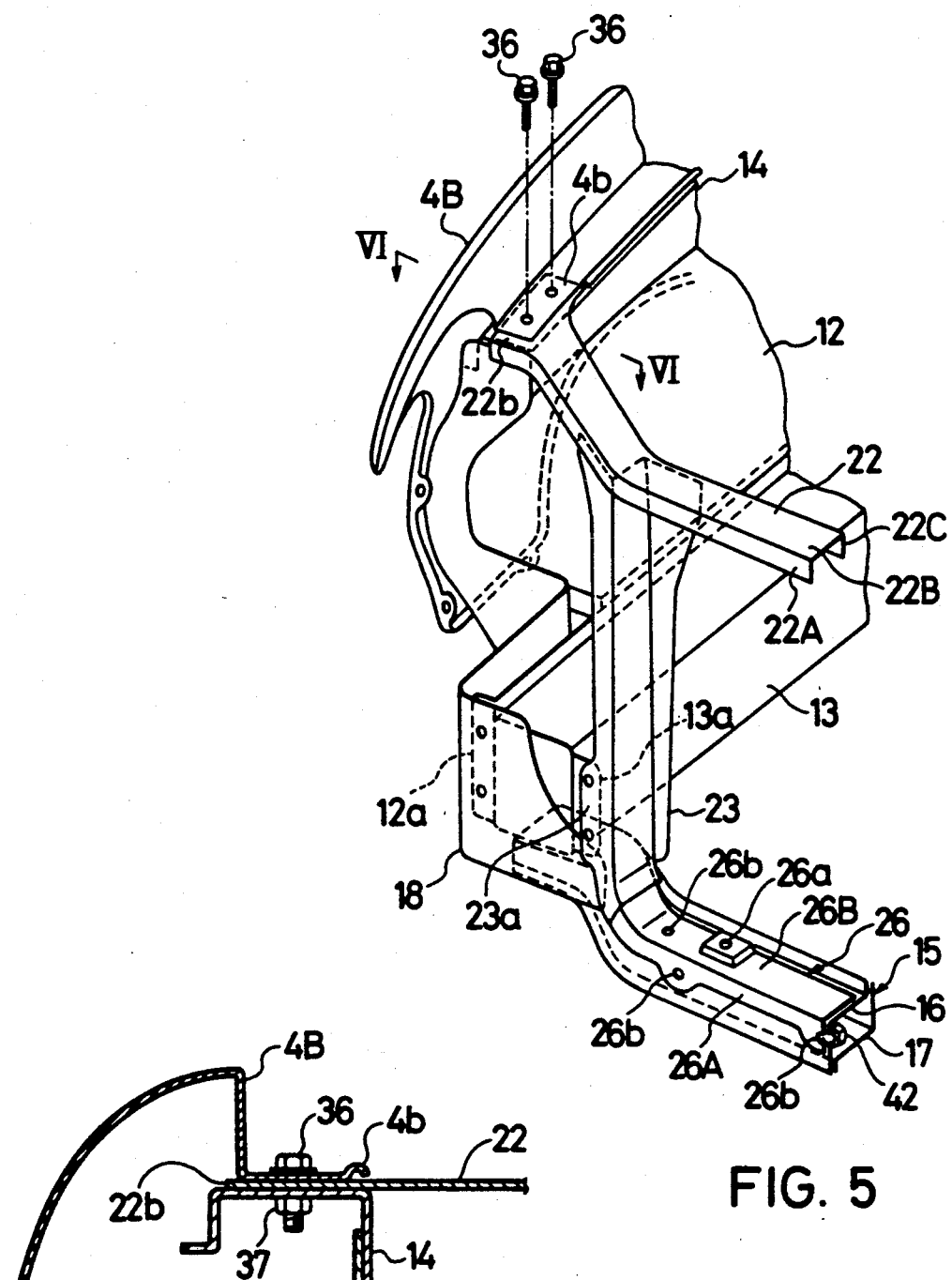
FIG. 5 is a perspective view of an important part after the nose unit is mounted to a vehicle body.
FIG. 6 is a sectional view taken on line VI—VI in FIG. 5.
Figure 7:
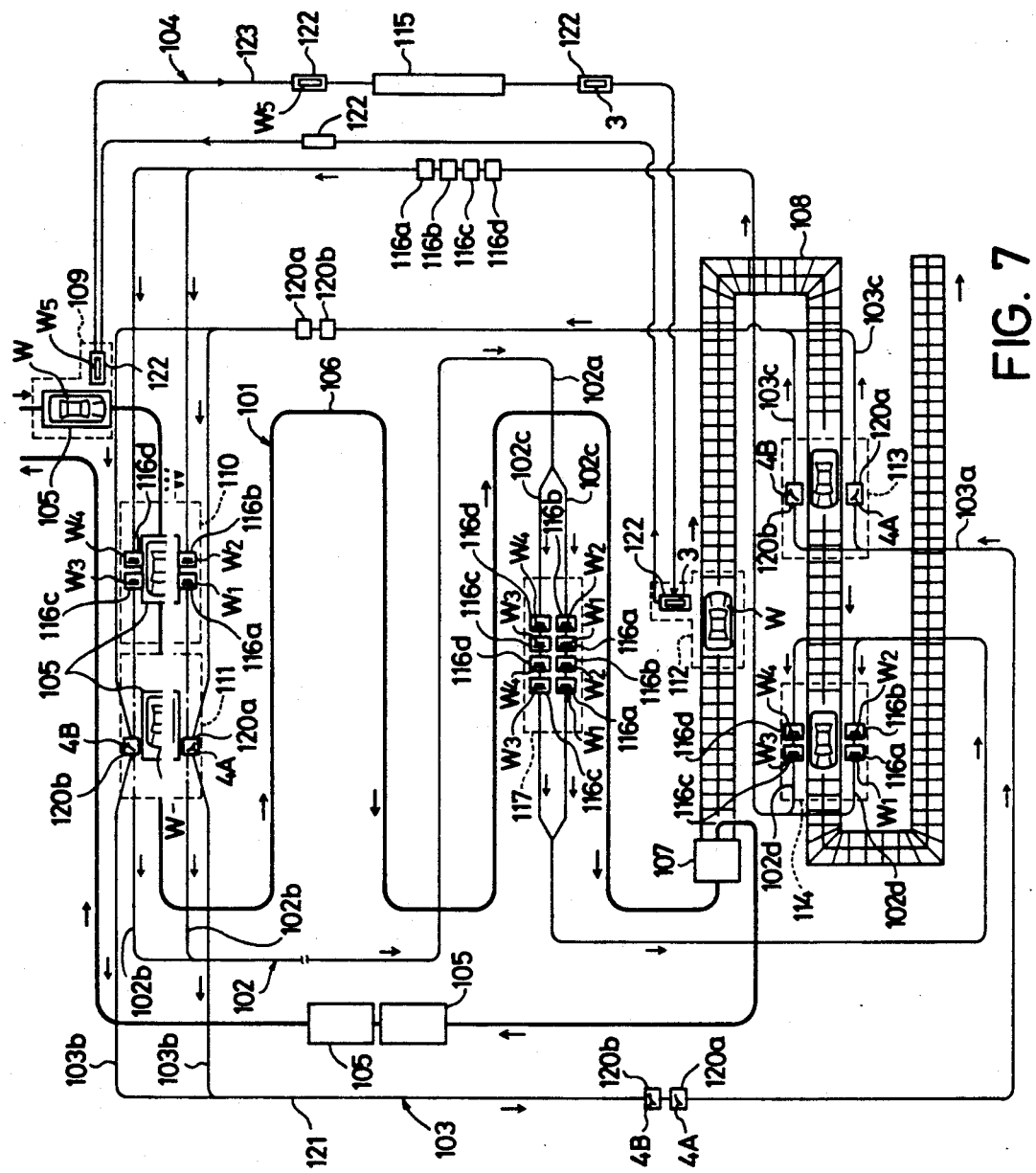
FIG. 7 is a descriptive diagram of an assembling line.
Figure 8:
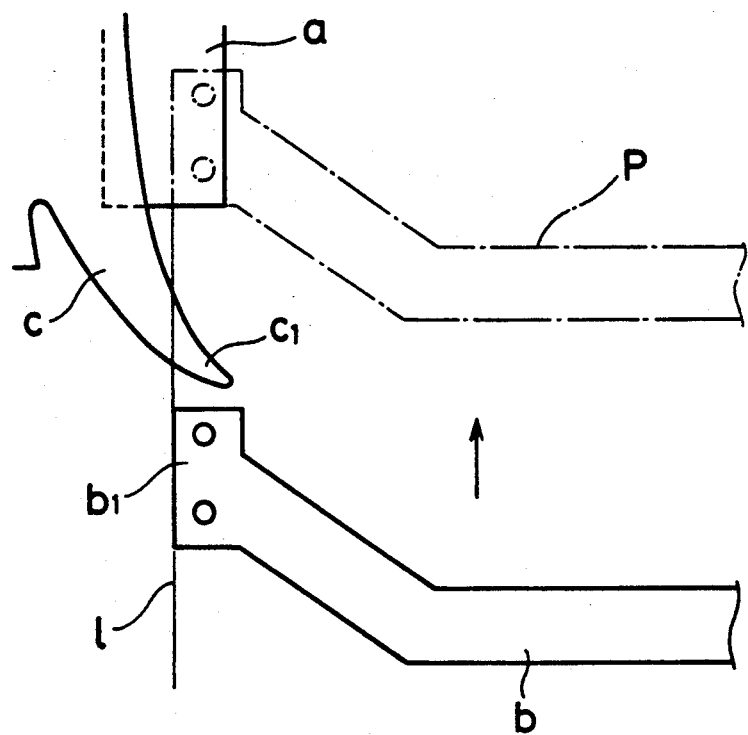
FIG. 8 is a descriptive diagram of a conventional art.

The condenser 24A and the radiator 24B are connected integrally by a member not shown in the drawings, the lower end portion of them are supported by mounting portions 26a of the upper wall part 26A of the support member 26 through rubber mount members 24, the upper end portion of them is fixed to the upper wall part 22B (fitting holes 22a) of the shroud upper 22 by tightening bolts (not shown in the drawings) through brackets 28. In FIGS. 6 and 7, reference numeral 29 disignates pulling hook fixed to the under side of a junction panel 31.

Mounting portions 23a are formed around the lower end portion of vertical members 23. Two bolts 33 out of four-in-a-set bolts provided a bumper reinforcement 32, a bumper 31 is mounted thereon, are fastened to a front end flange portion 13a of a front side flame 13 through the mounting portions 23a. The other two bolts 34 are fastened to a mounting flange portion 12a of the wheel apron 12 through the front end panel 18, passing through a lower side cutaway part 21a of the shroud panel 21.

Both ends of the bumper 31 are also fixed to a mounting portions 4a of front fenders 4A, 4B of the vehicle body 2 through bolts 35 provided on the bumper 31 and bolts (not shown in the drawing) passing through a mounting hole 31a of the bumper 31.

Both ends 22b of the upper wall part 22B of the shroud upper 22 are fixed to a mounting portion 4b (a nut 37) on the upper part of a front fender 4 and the wheel apron reinforcement 14 by bolts (only two bolts 36 for one of mounting portions 22b are shown in FIG. 5).

The support member 26 is supported on the cross member 15 (the upper member 16) and fixed to the front wall part 16A and the upper wall part 16B of an upper member 16 of the cross member 15 by bolt (not shown in the drawing) through the upper wall part 26A and a front wall part 26B of the support member 26, wherein the nose unit 3 is mounted to the vehicle body 2. Five nuts 42 are welded on the upper member 16, corresponding to a mounting hole 26b.

Reference numeral 51 designates an intercooler, an upper part thereof is clamped to the vertical wall part 22A of the shroud upper 22 by bolts 53 through brackets 52. The lower end portion of the intercooler 51 is supported by a bracket projecting from the bumper reinforcement, this is not shown in the drawings.

Reference numeral 54 designates a radiator grille positioned at front center part of a vehicle, having both right and left mounting portions 54a fitted into fitting holes of the vertical wall parts 22A of the shroud upper 22 and a center mounting portion 54b fitted into a fitting hole of a vertical member 56 of bonnet lock means 55. The bonnet means 55 is fixed to the vertical part 22A of the shroud upper 22 by bolts 57.

Reference numerals 61A, 61B are right and left lump unit, mounting portions 61a on the upper end of each unit is clamped to the vertical wall part 22A of the shroud upper 22 by bolts 62, and a mounting portion 61b on the lower end of each unit is clamped to the shroud panel 21 by bolts 63 (only bolts 62, 63 and mounting portion 61b for the lump unit 61A are illustrated in the drawing). Reference numerals 64, 65 are harness and similar to harness for connecting electric system, the former numeral 64 is clamped to the support member 26 by fastening bolts 67 into a mounting portion 66 and the latter numeral 65 is fixed into a fitting hole of the upper wall part 22B of the shroud upper 22 through mounting portions 68. Reference numerals 71 designate shock absorber members for the shock at opening/closing the bonnet 5 and connected to an upper wall part 22B of the shroud upper 22.

By the above structure, the nose unit 3 is constructed separately from the vehicle body 2 first, the cross member 15 is fixed thereon in the widthwise direction of the vehicle body.

Before the nose unit 3 is mounted to the vehicle body 2, right and left front fenders 4A, 4B are removed from the vehicle body 2. Under such a situation that the front fenders 4A, 4B are removed, the nose unit 3 is positioned so that the support member 26 is on the cross member 15, then the nose unit is fixed to the vehicle body 2.

Thereafter, front fenders 4A, 4B are mounted to the vehicle body 2 and construct a vehicle front body.

An assembling line for a vehicle will be described below.

In FIG. 7, reference numeral 101 designates a vehicle body conveyance line for conveying a vehicle body W out of a coating line in the arrow direction, reference numeral 102 designates a looped door conveyance line for conveying doors $W_1$-$W_4$ of the vehicle body W, reference numeral 103 designates a fender conveyance line for conveying front fenders 4A, 4B of the vehicle body W, and reference numeral 104 designates a unit conveyance line for conveying the nose unit 3 or a unit base.

On the vehicle body conveyance line 101, a hunger conveyor 106 including a vehicle body hunger 105 for conveying the vehicle body W by hunging it down and a slat conveyor 108 connected to the downstream side of the hunger conveyor 105 through a lifter 107 are provided.

On the upstream side of the hunger conveyor 106, a unit base removing station 109 for removing a unit base $W_5$ including the shroud panel 21 which is a base of the nose unit 3 and the cross member 15, etc, a door removing station 110 for removing right and left four doors $W_1$-$W_4$, and a front fenders removing station 111 for removing front fenders 4A, 4B are provided.

The above slat conveyor 108 conveys the vehicle body W, which get there through the lifter 107 from the conveyance hunger conveyor 106, to a nose unit mounting station 112 for mounting the nose unit 3 to the vehicle body W, to a front fenders mounting station 113 for mounting front fenders 4A, 4B to the vehicle W, and to a doors mounting station 114 for mounting four doors $W_1$-$W_4$ to the corresponding position of the vehicle body W. After the hunger conveyor 106 delivered the vehicle body W to the slat conveyor 108 though the lifter 107, the hunger conveyor 106 returns the empty vehicle body hunger 105 to the prior step.

Furthermore, provided between the door removing station 110 and the door mounting station 114 are a plurality of vehicle body parts mounting station (not shown in the drawings) for mounting parts to the vehicle body W wherein the doors $W_1$-$W_4$ are removed.

Furthermore, on the fender conveyance line 103, a hunger conveyor 121 having the same construction as the conveyance hanger conveyor 106, and conveys front fenders 4A, 4B by hanging them by fender hungers $120a$, $120b$. By those fender hunger $120a$, $120b$, front fenders 4A, 4B removed at the fender removing station 111 are conveyed to the front fender mounting station 113 and mounted to the vehicle body W at this station 113 before doors $W_1$-$W_4$ are mounted. Then the empty fender hunger $120a$, $120b$ are returned to the prior step.

A hunger conveyor 123, having the same construction as the conveyance hunger conveyor 106, conveying a unit base $W_5$ (the nose unit 3) by hunging it by a unit hunger 122 is provided on the unit conveyance line 104. By this unit hunger 122, the unit base $W_5$ removed at the unit base removing station 109 is conveyed to a subassembling station 115, where each part is mounted to the unit base so as to construct the nose unit 3.

Thus constructed nose unit 3 is conveyed to a nose unit mounting station 112 on the salt conveyor 108 and the empty unit hunger 122 is returned to the prior step.

Furthermore, by four door hungers $116a$-$116d$, the door conveyance line 102 holds doors $W_1$-$W_4$ respectively, which are removed from the vehicle body W at the door removing station 110 on the vehicle conveyance line 101 so as to convey them to a door mounting station 114 on the line 101. A door parts mounting station 117 mounting each part to each door $W_1$-$W_4$ where it should be is provided while this conveyance.

The above door conveyance line 102 is diverged to two lines $102b$, $102b$ at the station 110, $102c$, $102c$ at the station 117, and $102d$, $102d$ at the station 114. Each door hunger $116a$-$116d$ corresponds to each door $W_1$-$W_4$ at the diverging line portions $102b$, $102c$, $102d$ and moves along either right or left line so as to deliver and mount parts to the door. On the other hand, on a regular line joining portion $102a$ where lines join, each door hunger $106a$-$106d$ moves in a line according to the predetermined order of doors $W_1$-$W_4$.

Furthermore, fender conveyance line 103 diverges to two lines, $103b$, $103b$ and $103c$, $103c$ from a joining line $103a$ at stations 111 and 113 respectively. On a diverging line portions $103b$, $103c$, fender hungers $120a$, $120b$ correspond to front fenders 4A, 4B and move to right or left so as to deliver corresponding front fenders 4A, 4B respectively. On the other hand, on a line joining portions $103a$, fender hungers $120a$, $120b$ move in a line according to a predetermined order of front fenders 4A, 4B.

A method of assembling a vehicle front body will be described below.

The vehicle body W out of a coating line is hunged down by a vehicle body hunger 105 and conveyed along the vehicle body conveyance line 101. First, a unit base $W_5$ constituting the nose unit 3 is removed at a unit base removing station 108. The unit base $W_5$ removed from the vehicle body W is conveyed to the subassembling station 115, where parts of the nose unit such as the bumper 31 and lump units 61A, 61B are assembled to constitute the nose unit 3, by a unit hunger 122 on the hunger conveyor 123 along a unit conveyance line 104. Thus constituted nose unit 3 is conveyed to the nose unit mounting station 111 by a unit hunger 122.

On a removing station 110 following after a unit base removing station 109, doors $W_1$-$W_4$ are removed from the vehicle body W, where the unit base is already removed. The doors $W_1$-$W_4$ removed from the vehicle body W are transferred to door hungers $116a$-$116d$, which plurality of couples of hungers $116a$, $116b$ for left doors and a plurality of couples of hungers of $116c$, $116d$ for right doors are returned separately to the door removing station 110. Then the doors $W_1$-$W_4$ are conveyed to the door parts mounting station 116 on the door conveyance line 102 and door parts are mounted to doors, then further conveyed to a door mounting station 114.

At the front fender removing station 111, right and left front fenders 4A, 4B are removed from the vehicle body W, doors $W_1$-$W_4$ were removed therefrom, and conveyed to a front fender mounting station 112 by a fender conveyance line 103.

The vehicle body W where a unit base, doors $W_1$-$W_4$, and front fenders 4A, 4B are removed is conveyed by the hunger conveyor 106 and transferred to the slat conveyor 108 through the lifter 107. While this process, parts are mounted to the vehicle body W. Then it is conveyed to the nose unit mounting station 111.

At this nose unit mounting station 111, the nose unit 3 is mounted (fixed) to the vehicle body 2. At this time, since front fenders 4A, 4B are not mounted to the vehicle body 2, the nose unit 3 is mounted to the vehicle body 2 easily without interfering with front fenders 4A, 4B.

Right and left fenders 4A, 4B are mounted to the vehicle body W, the nose unit 3 is mounted thereon, at the following front fender mounting station 112. Thereafter doors $W_1$-$W_4$ are mounted to the vehicle body W on the basis of the relation of the position with the front fenders 4A, 4B. While the vehicle body W after doors are mounted thereon is conveyed to the following assembling step through the slat conveyor 108, each empty door hunger $116a$-$116d$ after bringing down doors $W_1$-$W_4$ at the door mounting station 114 is returned to the door removing station 110 and are used for next door conveyance.

The movement of each group of hungers $116a$-$116d$ around a door parts mounting station 116 and the door mounting station 114 is performed in the same manner as the movement around the door removing station 110. The vehicle body hunger 105 after delivering the vehicle body W to the slat conveyor 108 is returned to the prior step in order to convey the vehicle body W finished coating to the door removing station 110 again.

In the above embodiment, as shown in FIG. 6, since the shroud upper 22 constituting a unit base $W_5$ is mounted on the under side of the front fender 4B (4A), when the unit base removing station 109 is provided on further upstream side than the front fender removing station 111 as shown in FIG. 7, in order to ease the removing operation of the unit base $W_5$, the vehicle body 2 is conveyed to the vehicle assembling line through a coating line wherein the shroud upper 22 (the unit base W₅) is mounted to the vehicle body 2 removably by a jig without removing front fenders 4A, 4B on the assembling line, this differs from the regular construction. Or, at the unit base removing station 109, front fenders 4A, 4B may be removed from the vehicle body 2 together with the unit base W₅ and thus removed front fenders 4A, 4B are temporarily attached to the vehicle body 2 by a jig until the front fender removing station 111 so that they are removed easily at the front fender removing station 111.

Also, when the construction of FIG. 6 is applied, the front fender removing station 111 may be provided on further upstream side than the unit base removing station 109, or one station having two functions of removing front fenders 4A, 4B and removing the unit base may be provided instead.

Furthermore, when the construction of FIG. 6 is applied, it is desirable that the nose unit mounting station 112 is provided on further upstream side than a front fender mounting station 113 as shown in FIG. 7, taking into account the mounting order. Or, one station having two functions of mounting a nose unit to the vehicle body 2 and mounting front fenders 4A, 4B in this order may be provided.

In the above embodiment, although the front fender removing station 111, the conveyance line 103, and the mounting station 113 are provided exclusively, doors W₁-W₄ or nose unit 3 removing stations 110, 109, conveyance lines 102, 104, and mounting stations 114, 112 can be formed integrally. Particularly, when door conveyance and vehicle body conveyance is carried out jointly, in order to obtain well fitting, mounting to the vehicle body 2 should be done in this order: front fenders 4A, 4B, front doors W₁, W₃, and rear doors W₂, W₄.

Various changes and modifications may be made without departing from the spirit of the present invention and it is therefore the above embodiment is given solely for explanatory purposes and is not restrictive. Moreover, the scope of the present invention is to be considered as being delimited, not by any particular details of the disclosed preferred embodiments, or of the drawings, but solely by the scope of the accompanying claim, and therefore it is aimed to a cover all such modifications and variations as fall within the scoped spirit of this invention.

What is claimed is:

1. A method of assembling a front part of a vehicle body including doors, right and left front fenders, and a nose unit including at least both a shroud panel and a shroud upper, having said nose unit mounted to said front part of said vehicle body after said nose unit is constructed, comprising the steps of:
   removing said right and left front fenders from said vehicle body before said nose unit is mounted to said vehicle body;
   mounting said nose unit wherein said right and left front fenders are removed; and
   mounting said right and left front fenders to said vehicle body after said nose unit is mounted to said vehicle body.

2. A method of assembling a front part of a vehicle body as claimed in claim 1, further comprising a step of
   removing said right and left front fenders after said doors are removed from said vehicle body wherein said nose unit is not mounted to said vehicle body yet.

3. A method of assembling a front part of a vehicle body as claimed in claim 2, further comprising a step of
   mounting said doors to said vehicle body in relation to positions of said right and left front fenders after said right and left fenders are mounted to said vehicle body.

4. A method of assembling a front part of a vehicle body as claimed in claim 3, wherein
   said doors are conveyed separately from said right and left front fenders and door parts are mounted to said doors while said doors are removed from said vehicle body and later mounted to said vehicle body.

5. A method of assembling a front part of a vehicle body as claimed in claim 1, wherein
   said nose unit comprises components, including a bumper and a lamp unit, other than said shroud panel and said shroud upper, said components being subassembled so as to make said nose unit before said nose unit is mounted to said vehicle body.

* * * * *